J. A. BOZUNG.
QUICK LOCKING CAP FOR THE AIR VALVES OF AUTOMOBILE TIRES.
APPLICATION FILED JUNE 16, 1921.
1,406,336. Patented Feb. 14, 1922.
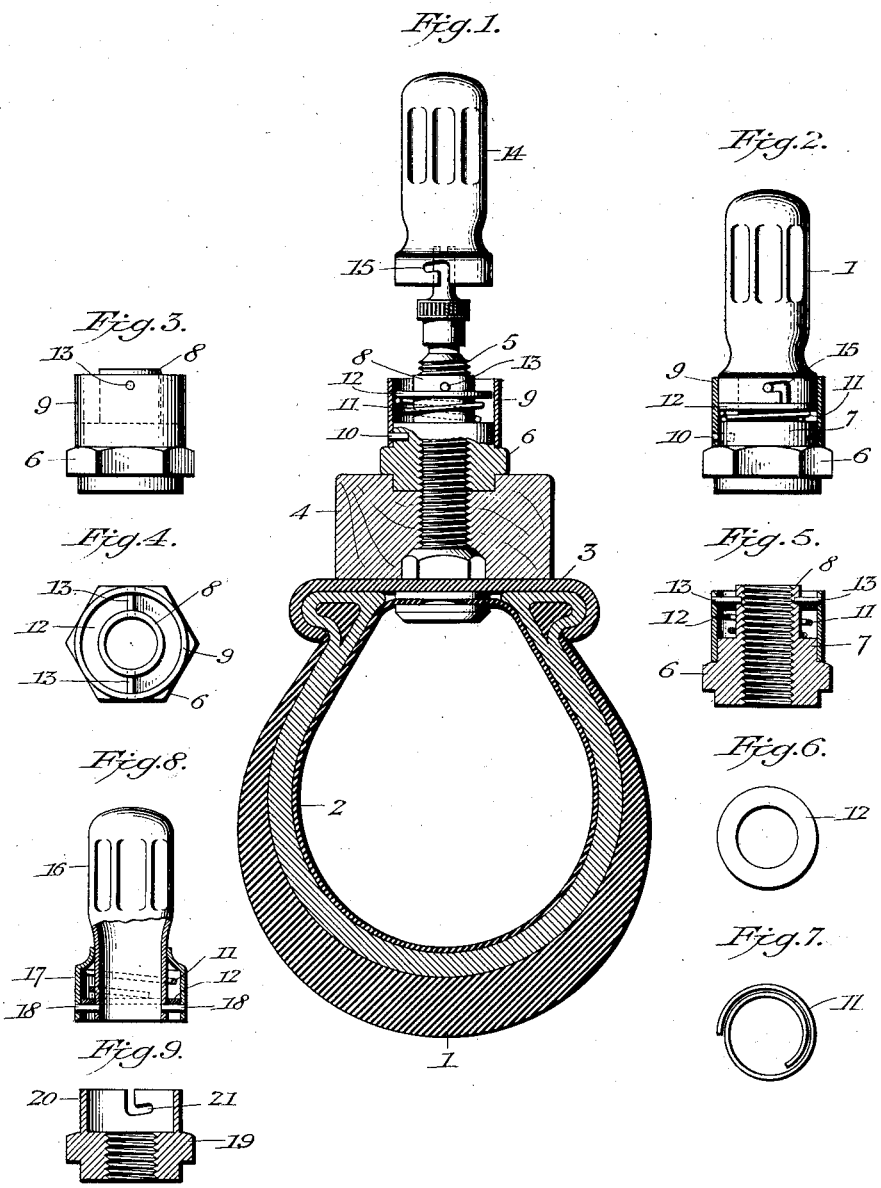
Inventor:
Joseph A. Bozung
By
H. S. Bailey, Attorney.

UNITED STATES PATENT OFFICE.

JOSEPH A. BOZUNG, OF DENVER, COLORADO.

QUICK-LOCKING CAP FOR THE AIR VALVES OF AUTOMOBILE TIRES.

1,406,336.  Specification of Letters Patent. Patented Feb. 14, 1922.

Application filed June 16, 1921. Serial No. 478,041.

*To all whom it may concern:*

Be it known that I, JOSEPH A. BOZUNG, formerly a citizen of Germany, but having declared my intention of becoming a citizen of the United States of America, and now residing at the city and county of Denver and State of Colorado, have invented new and useful Quick-Locking Caps for the Air Valves of Automobile Tires, of which the following is a specification.

This invention relates to improvements in quick locking caps for the air valves of automobile tires.

The object of the invention is to provide means whereby the air valve cap can be quickly attached over the valve, to enclose the same, or as quickly removed to permit access to the valve in such manner as to eliminate the usual threaded connection of the cap with the valve.

Further, to provide a specially constructed nut which is screwed upon the valve and against the felly of the wheel, and a cap adapted to enclose the outer portion of the valve and to be secured to the said nut by a bayonet joint connection, whereby the attachment or removal of the cap is quickly accomplished, means being employed for preventing the accidental disconnection of the cap from the nut.

These objects are accomplished by the mechanism illustrated in the accompanying drawings, in which:

Figure 1 is a vertical, sectional view through an automobile tire, rim and felly, showing an air valve in operative connection therewith, the improved clamping nut thereon, and the valve cap disconnected from the nut.

Fig. 2 is a side view, partly in section, showing the cap and nut in locked engagement, and disconnected from the valve.

Fig. 3 is a side view of the nut.

Fig. 4 is a plan view of the same.

Fig. 5 is a vertical sectional view thereof.

Fig. 6 is a plan view of a washer which forms a part of the mechanism of the nut.

Fig. 7 is a plan view of the spiral coil spring which is interposed between the washer and the end of the nut. And Figs. 8 and 9 are sectional views illustrating a modification in the arrangement of the cap and nut respectively.

Referring to the accompanying drawings:

The numeral 1, designates an ordinary pneumatic tire, and 2, the usual inner tube; 3, the metal wheel rim; 4, the felly, and 5, the air valve, which is connected to the tube 2, in the usual manner, and extends through the rim and felly, all of these parts being of a type in common use.

The common type of air valve is threaded exteriorly, and extends out through the felly; a clamp nut is screwed upon the extended portion of the valve and against the felly, and a tubular cap is screwed upon the valve and against the clamp nut to protect the valve against contact with an object in such manner as to cause the tube to be accidentally deflated.

Considerable time is required to unscrew the present style of cap from the valve, and to screw the same in place again, and the present invention eliminates this objectionable feature by providing a special form of clamp nut, and a cap which can be quickly attached to and detached from said nut, which are constructed and arranged as follows: In carrying out my invention, I provide a nut 6, which takes the place of the usual nut which is screwed upon the valve and against the felly, and this nut has a circular extension or boss 7, formed on its top side, from which projects a tubular extension 8, which is interiorly threaded to form a continuation of the usual threaded hole in the nut. A band or housing 9, fits tightly upon the boss 7, and is secured thereon by a pin 10, and the rim or upper end of this band is about on a level with the upper end of the tubular extension 8. This band may form an integral part of the nut, if desired, but it is preferable to make it detachable, and secure it in the manner described.

An expansion spiral coil spring 11, surrounds the tubular extension 8, and rests upon the boss 7, and a washer 12, fits loosely upon the side extension and rests upon the spring 11. Oppositely positioned pins 13, extend through the band 9, near the upper end thereof, and into the opposite sides of the extension 8, and these pins limit the upward movement of the washer 12, which is forced against the said pins by the tension of the spring 11; the pins 13 also forming the locking means between the nut 6, and the valve cap. The cap 14, is a tubular form of cap, the open end portion or rim of which is provided on opposite sides with bayonet joint slots 15, which extend into the rim a short distance, and at right angles to the edge of the same and terminate in hook portions which are at an acute angle to the entrance portions of the slot.

The rim portion of the cap is of a diameter to fit snugly in the housing band 9, and in securing the cap to the nut 6, the rim portion of the cap is inserted in the housing 9, and against the washer 12, the slots 15, being in position to receive the pins 13. The cap is pushed in against the tension of the spring 11, until the pins 13, engage the bends in the slots and limit further inward movement of the cap. The cap is then given a slight turn in the proper direction, which causes the hooked ends of the slots to engage the pins, and thereby lock the cap to the nut 6. The spring 11, being of spiral form, can be compressed to the thickness of the wire of which it is made, and when the cap is locked to the nut, as shown in Figure 2, the spring is thereby compressed to occupy but a slight space, and this arrangement permits a shorter housing 9, to be employed than would be the case if an ordinary coil spring were used. The spring exerts a strong pressure against the washer 12, which is thus pressed against the edge or rim of the cap, and the hooked portions of the bayonet slot are thus held against the pins, and as the hooked portions incline upward from their outer ends, an accidental turning movement of the cap, which would release the same, is prevented. To remove the cap it is only necessary to turn the same to release the pins 13, from the hooked end of the bayonet slots 15, when the said cap will be forced out of the housing band 9, by the spring actuated washer 11. The cap is thus secured to the nut 6, or removed therefrom by a slight expenditure of time and effort, and when secured, the housing covers the slots 15, and prevents dust and grit from entering the cap. The washer 12, besides acting as an abutment for the upper end of the spring, also prevents foreign substances from entering the housing and interfering with the action of the spring.

In Figures 8 and 9 is shown a modified form of the cap and nut. In this arrangement, a cap 16, is employed, upon the open end portion of which is placed a band 17, which is spaced from the cap a suitable distance, the inner end of the band being reduced to fit tightly upon the cap, to which it is secured in any suitable manner. In the space between the cap and band is placed the spiral coil spring 11, and the washer 12, is placed over the end of the cap and upon the spring, partially compressing the same, and diametrically opposite pins 18, are passed through the outer end portions of the band and cap and hold the washer in place. The nut 19, is formed upon its upper side, with a circular wall 20, which is provided at diametrically opposite points with bayonet joint slots 21. The cap is pressed down over the wall 20, the pins 18 entering the slots 21, and when the cap is given a slight turn, the pins 18, are locked in the hook portions of the slots, as in the manner previously described.

Having described my invention, what I claim as new and desire to secure by Letters Patent, is:

1. The combination with an air valve for automobile tire tubes, of a nut on said valve having an internally threaded tubular extension which is also threaded to said valve, a circular wall on said nut surrounding said extension and spaced therefrom diametrically opposite pins supported in said wall and said extension, a washer on said extension below said pins, and an expansion coil spring surrounding said extension and interposed between the washer and the nut, and a tubular cap for said valve having bayonet joint slots at opposite points in its open end portion for engaging said pins, the hook portions of said slots being at an acute angle to their entrance portions, whereby when said cap is inserted in said wall against said spring actuated washer, and locked to said pins, the pressure exerted by the spring actuated washer against the end of said cap prevents accidental disconnection of the same from said pins.

2. The combination with the felly, the rim and the tire of an automobile wheel, the tube in said tire, and an air valve connected to said tube and extending out through said felly, of a nut which is screwed upon said air valve against said felly, having a tubular extension surrounding said valve, a spring actuated washer on said extension, a housing on said nut surrounding said extension and spaced therefrom, pins supported in said housing and said extension and confining said spring actuated washer within said housing, a tubular form of cap for said air valve having a bayonet joint locking connection with said pins, said washer bearing against the engaging end of said cap, thereby holding the same against unlocking movement.

3. The combination with a threaded air valve stem for automobile tire tubes, of a nut on said stem having a circular projection, a circular housing secured to said projection, said nut also having an internally threaded tubular member extending from said circular projection which is threaded to said stem, diametrically opposite pins, the ends of which are supported in the circular housing and in the said tubular member, a cap for said valve stem adapted to be inserted in said housing and releasably attached to said pins, and a spring pressed washer in said housing and surrounding said tubular member, which is depressed by the insertion of said cap, said pins also serving to hold the washer in the housing, when the cap is removed.

In testimony whereof I affix my signature in presence of two witnesses.

JOSEPH A. BOZUNG.

Witnesses:
G. SARGENT ELLIOTT,
ELIZABETH SMITH.